United States Patent [19]

Lins

[11] Patent Number: 4,457,328
[45] Date of Patent: Jul. 3, 1984

[54] COMBINED POSITIVE SEAL AND REPETITIVE ACTUATION ISOLATION VALVE

[75] Inventor: Richard C. Lins, Tarzana, Calif.

[73] Assignee: HR Textron Inc., Valencia, Calif.

[21] Appl. No.: 371,401

[22] Filed: Apr. 26, 1982

[51] Int. Cl.³ .............................................. F16K 13/04
[52] U.S. Cl. ............................. 137/68 R; 137/614.13; 137/614.18
[58] Field of Search .................. 137/67, 68 R, 614.11, 137/614.13, 614.18

[56] References Cited

U.S. PATENT DOCUMENTS

| | | | |
|---|---|---|---|
| 1,671,368 | 5/1928 | Johann | 137/68 R X |
| 2,222,141 | 11/1940 | Denison | 137/614.13 |
| 3,424,181 | 1/1969 | Morse | 137/68 R |
| 3,559,946 | 11/1971 | Baxter | 251/129 |
| 3,587,601 | 6/1971 | Skippy | 137/67 |
| 3,633,596 | 1/1972 | Gerber | 137/68 R |

FOREIGN PATENT DOCUMENTS 576474 10/1977 U.S.S.R. ........................... 137/68 R

Primary Examiner—Harold W. Weakley
Attorney, Agent, or Firm—Nilsson, Robbins, Dalgarn, Berliner, Carson & Wurst

[57] ABSTRACT

In-line valve means for isolating a source of fluid under pressure from a desired using apparatus until use of the fluid is desired. The in-line valve means includes a positively sealed plug and an on-off isolation control valve which is positioned by appropriate electromagnetic means such as a torque motor or a solenoid. The plug has a frangible area which is sheared by forces generated by the electromagnetic force motor. After the plug is sheared it is positioned by appropriate means within the flow path to preclude substantial interference with the flow of fluid from the source through the control valve to the outlet. Subsequent repetitive on-off control of the fluid may be accomplished with a second seal and seat in series with the positive seal plug and actuated by the same electromagnetic means.

10 Claims, 3 Drawing Figures

//4,457,328//

COMBINED POSITIVE SEAL AND REPETITIVE ACTUATION ISOLATION VALVE

BACKGROUND OF THE INVENTION

1. Field of the Invention

The invention relates generally to isolation valves and more specifically to such valves in which a positively sealed isolation valve and a flow control valve are combined within a single housing.

2. The Prior Art

In the prior art it has been common in applications where fluid under pressure is to be quickly moved from one point to another, such as spacecraft propulsion systems, to provide a fast operating valve device to open flow paths for the fluid. In many instances a positive seal between the source of fluid under pressure and the outlet is also required to preclude fluid leakage until use is required. In the prior art, the operation of such positive seal valves has commonly occurred by utilization of pyrotechnic devices such as explosive charges, or alternatively through a source of gas under high pressure and in some instances through manual means. The utilization generally of pyrotechnic devices generates undesired products of combustion which may be detrimental. Sources of gas under pressure themselves require means for releasing the gas which in turn may necessitate the utilization of secondary explosive squibs or the like. Manually operated devices necessitate access to the structure to operate the manual apparatus, which in many instances, for example, space craft, is not normally possible.

Examples of prior art devices known to applicants are shown in U.S. Pat. Nos. 3,431,731, 3,620,237, 3,797,805, 3,903,914, 4,149,555, 4,181,139 and 4,244,386.

SUMMARY OF THE INVENTION

A normally sealed valve having a flow path for fluid under pressure which is blocked by a positive seal plug having a frangible seal. An operating rod is coupled between the plug and an electromagnetic force motor in such a manner that upon actuation of the electromagnetic force motor the frangible seal is ruptured thereby opening the flow path for the fluid under pressure.

In accordance with a more specific aspect of the present invention, there is also disposed within the flow path an on-off flow control valve means which is also operatively connected to the electromagnetic force motor.

DETAILED DESCRIPTION OF THE PREFERRED EMBODIMENT

Figure 1:
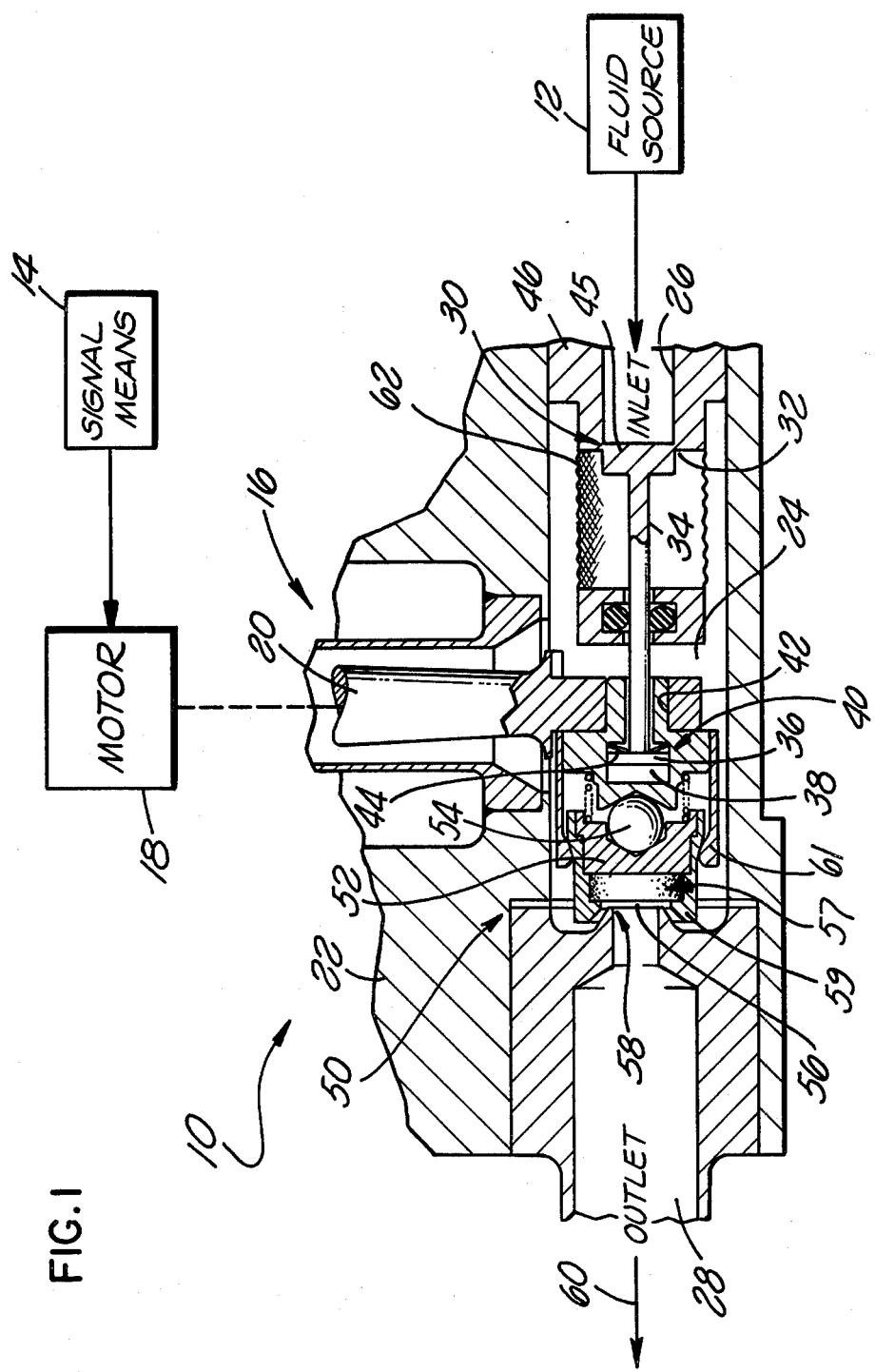
FIG. 1 is a schematic diagram, partly in block form and partly in cross section, of a valve constructed in accordance with the present invention in its unoperated condition.

As is shown in the drawings, and more particularly in FIG. 1, a valve 10 constructed in accordance with the principles of the present invention controls the flow of fluid under pressure from a source thereof 12 to an outlet 28 in response to signals applied from a source 14 thereof to an electromagnetic force motor 16 which may include a motor 18 and an actuating arm 20 as shown. The valve 10 includes a housing 22 which defines a flow path 24 for the fluid. The flow path 24 includes an inlet 26 and the outlet 28.

Disposed within the flow path 24 is a plug means 30 which positively seals the inlet 26 to the flow path, thus isolating the fluid contained in the source 12 from the flow path 24. The plug means 30 includes a reduced area portion 32 which is frangible and upon the application of sufficient force to the plug means 30 will rupture or shear. The plug 30 provides a positive seal which totally prevents any fluid leakage until such time as use thereof is required in the system which incorporates the valve. The plug means 30 includes a rod 34 rigidly secured thereto which in turn is coupled to the actuating arm 20 of the electromagnetic force motor 16. The rod 34 includes a head 36 which is disposed within a cavity 38 defined by a base pivot 40 which is fitted within an opening 42 at the end of the actuating arm 20. A spring 44 in the form of a Bellville washer is disposed within the cavity 38 for a purpose to be defind below. As is seen in FIG. 1, the plug means 30 including the rod 34, the plug 45 and the insert 46, forming the inlet passageway 26, are preferably formed of a unitary metal member which has been machined to provide the reduced area frangible portion 32 for the plug means 30. It will be understood by those skilled in the art that the plug means 30 may be formed from separate pieces which are secured together to form the positive seal such as by welding, brazing, soldering or the like, so long as the frangible area 32 is provided.

Positioned in series alignment with the plug means 30 is an on-off control valve means 50 which is also affixed to the torque motor 20. The control valve 50 is generally of the type shown in U.S. Pat. Nos. 3,559,946 and 3,669,408 which are incorporated herein by reference. Generally, the control valve 50 has a self-aligning poppet 52 supported upon a ball 54 and carries a seal surface 56 which engages a valve seat 58 to control flow of fluid through the outlet passageway 28 as shown by the arrow 60. The surface 56 is defined by a soft seal 57 which is held in place by a seal retainer 59 which in turn is held in place by a shell 61 which is secured to the base pivot 40 as by welding or the like.

Those skilled in the art will recognize that upon application of electrical signals from the signal means 14 to the motor 18 the armature 20 moves to repetitively open or close the valve means 50 thus permitting flow of fluid from the fluid source 12 through the flowpath 24. It will also be recognized by those skilled in the art that so long as the plug 45 is in position as shown in FIG. 1, the fluid source 12 is positively sealed from the flow path 24 and no fluid can flow.

The reduced area portion 32 is appropriately designed to provide a frangible area which may be ruptured by the application of an appropriate signal from the signal means 14 to the motor 18. Thus the arm 20 will move (upon application of appropriate signal to motor 18) toward the left as viewed in FIG. 1. As it moves the spring 44 will be depressed and upon the force motor reaching nearly the peak of its signal strength and the armature nearly the full distance of its travel toward the left, the frangible area 32 will rupture. The spring 44 immediately moves the plug 45 toward the left and away from the inlet 26 by an amount sufficient so that the plug does not interfere substantially with fluid flow through the flow path 24. An appropriate screen 62 is provided to capture any waste material which may be generated when the frangible area 32 ruptures. Subsequent to the rupture of the frangible area 32, full control of the flow of fluid from the fluid source to the outlet 28 is accomplished by the control valve 50. As can be seen, the two valves (the positive seal plug means and the control valve) are serially disposed within the flow path 24 which is within the single housing 10.

Figure 2:
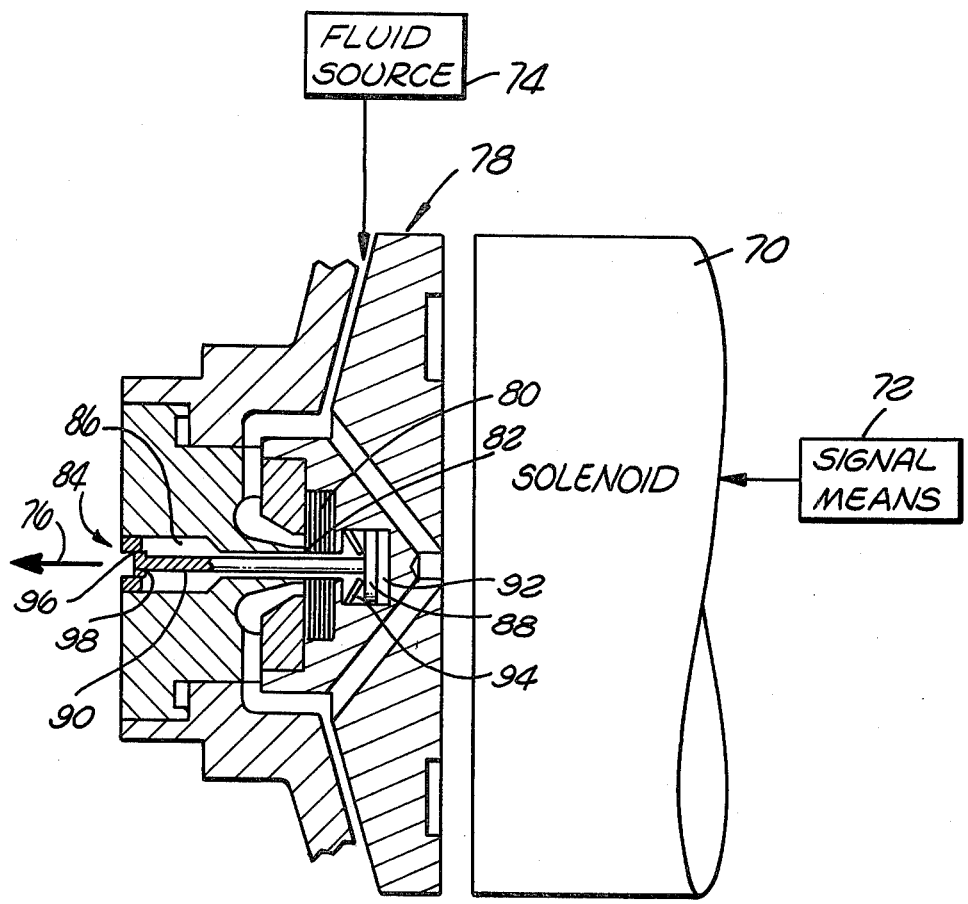
FIG. 2 is a schematic diagram, partly in block form of an alternative embodiment of a valve constructed in accordance with the present invention in its unoperated form.

In some instances it is more desirable to utilize a solenoid as the electromagnetic force motor as opposed to the typical torque motor as shown in FIG. 1. Such an alternative structure is illustrated in FIG. 2. In addition thereto the structure of FIG. 2 illustrates the plug means in a downstream position from the control valve whereas in the torque motor structure of FIG. 1, the plug is positioned upstream from the control valve.

As is shown in FIG. 2, the valve of the present invention includes a typical solenoid 70 controlled by signals from a signal means 72 to control the flow of fluid from a source 74 thereof to an appropriate outlet as shown by the arrow 76. The solenoid includes an armature 78 which carries a portion of the control valve including a valve surface defining means 80 which functions with a stationary valve seat 82 to control the flow of fluid from the source 74 to the outlet 76. It will again be noted that a plug means 84 is positioned in the flow path 86 and thus positively isolates the fluid source 74 from the outlet 76, irrespective of the position of the valve 80. The plug means 84 is constructed precisely as described in conjunction with FIG. 1 for the plug means 30 and also includes a head 88 attached to the opposite end of the rod 90 and positioned in the cavity 92 with an appropriate spring such as the Bellville spring 94.

In operation, when a signal is applied to the solenoid 70 from the signal means 72, the armature 78 moves toward the right, thereby compressing the spring 94. As the armature reaches the terminus of its travel, sufficient force is applied through the rod 90 to the plug means 84 to rupture the frangible area 96 of the plug means 84, thereby releasing the flow of fluid as above described. Immediately the spring 94 places the plug 98 in a position such that it does not interfere substantially with fluid flow through the flow path 86.

Figure 3:
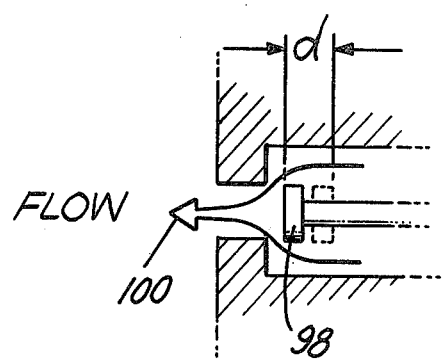
FIG. 3 is a partial schematic diagram showing a portion of the valve of FIG. 2 in its operated condition.

The position of the plug 98 after rupture of the frangible area 96 is illustrated more fully in FIG. 3. As is therein shown the plug 98 moves through the distance d as the armature 78 responds to the electrical signals applied from the signal means 72. Thus the fluid under pressure may flow as shown by the arrow 100 without interference from the plug 98.

Again it will be noted that the plug 84 and the valve 80 are serially disposed within the flow path 86 and function so that the valve 80 repetitively opens and closes to control the flow of fluid through the flow path but only after the plug has ruptured through application of force from the electromagnetic force motor. It is also noted that the valve 80 and the plug 84 are positioned within the same valve housing thereby eliminating the necessity for separate housings and separate actuating members as has been the case in the prior art.

There has thus been disclosed a single valve housing which incorporates a positive seal and a repetitively actuated isolation valve each operable by the same electromagnetic force motor. Such a structure is less costly and eliminates weight as compared to prior art devices accomplishing the same functions.

What is claimed is:

1. An electromagnetically actuated normally sealed valve for release of high pressure fluid comprising:
   means defining a flow path for fluid under pressure;
   plug means normally blocking said flow path, said plug means including a unitary member defining a reduced area portion for providing a frangible seal;
   an electromagnetic force motor;
   an operating rod rigidly permanently secured to said plug means;
   means coupling said operating rod between said plug means and said force motor; and
   means for actuating said force motor for applying sufficient force to said plug to rupture said frangible seal and open said flow path.

2. A valve as defined in claim 1 which further includes flow control means disposed in said flow path, said flow control means being operatively connected to said electromagnetic force motor.

3. A valve as defined in claim 2 which further includes means for retaining said plug in a position in said flow path subsequent to rupture of said seal that does not substantially interfere with fluid flow therethrough.

4. A valve as defined in claim 3 wherein said control valve and said plug are series disposed in said flow path, said plug being downstream from said control valve.

5. A valve as defined in claim 3 wherein said control valve and said plug are series disposed in said flow path, said plug being upstream from said control valve.

6. A valve as defined in claim 3 wherein said control valve and said plug are series disposed in said flow path and said force motor is a solenoid.

7. A valve as defined in claim 3 wherein said control valve and said plug are series disposed in said flow path and said force motor is a torque motor.

8. A valve as defined in claim 1 wherein said rod, said plug and said seal are formed from a unitary member.

9. A valve as defined in claim 1 wherein said coupling means includes spring means disposed between said force motor and the opposite end of said rod from said plug.

10. A valve as defined in claim 9 wherein said spring means retains said plug in a position in said flow path, subsequent to rupture of said seal, that does not interfere substantially with fluid flow therethrough.

* * * * *